US008197344B2

(12) United States Patent
Rathsack et al.

(10) Patent No.: US 8,197,344 B2

(45) Date of Patent: Jun. 12, 2012

(54) GAMING TERMINAL DATA MONITORING NETWORK

(75) Inventors: Erhard Walter Rathsack, Reno, NV (US); Mark Bernard Gagner, West Chicago, IL (US)

(73) Assignee: WMS Gaming Inc., Waukegan, IL (US)

( * ) Notice: Subject to any disclaimer, the term of this patent is extended or adjusted under 35 U.S.C. 154(b) by 2308 days.

(21) Appl. No.: 10/409,285

(22) Filed: Apr. 8, 2003

(65) Prior Publication Data

US 2004/0204244 A1 Oct. 14, 2004

(51) Int. Cl.

*A63F 9/24* (2006.01)

*A63F 13/00* (2006.01)

(52) U.S. Cl. .................. 463/42; 463/1; 463/20; 463/25; 463/29; 463/40; 463/41; 273/138.1; 273/138.2; 273/143 R; 700/91

(58) Field of Classification Search ................ 463/1, 20, 463/25, 29, 40–42; 273/138.1–138.2, 143 R; 700/91; 709/224

See application file for complete search history.

(56) References Cited

U.S. PATENT DOCUMENTS

| | | | | | |
|---|---|---|---|---|---|
| 4,636,951 | A | | 1/1987 | Harlick | 364/412 |
| 4,941,143 | A | * | 7/1990 | Twitty et al. | 370/445 |
| 4,969,146 | A | * | 11/1990 | Twitty et al. | 370/338 |
| 5,249,800 | A | * | 10/1993 | Hilgendorf et al. | 463/27 |
| 5,470,079 | A | * | 11/1995 | LeStrange et al. | 463/25 |
| 5,490,060 | A | * | 2/1996 | Malec et al. | 705/10 |
| 5,816,918 | A | * | 10/1998 | Kelly et al. | 463/16 |
| 6,041,041 | A | * | 3/2000 | Ramanathan et al. | 370/241 |
| 6,099,408 | A | * | 8/2000 | Schneier et al. | 463/29 |
| 6,254,483 | B1 | * | 7/2001 | Acres | 463/26 |
| 6,383,076 | B1 | | 5/2002 | Tiedeken | 463/40 |
| 6,409,602 | B1 | * | 6/2002 | Wiltshire et al. | 463/42 |
| RE37,885 | E | | 10/2002 | Acres et al. | 463/42 |
| 6,625,648 | B1 | * | 9/2003 | Schwaller et al. | 709/224 |
| 6,763,386 | B2 | * | 7/2004 | Davis et al. | 709/224 |
| 7,311,605 | B2 | * | 12/2007 | Moser | 463/25 |
| 2002/0046399 | A1 | | 4/2002 | Debling | 717/138 |
| 2002/0165023 | A1 | | 11/2002 | Brosnan et al. | 463/29 |

OTHER PUBLICATIONS

Peterson & Davie, 'Computer Networks: A Systems Approach', Morgan Kaufmann Publishers, 2nd Edition, pp. 30-45, 172-173, 368-382.*

* cited by examiner

*Primary Examiner* — Dmitry Suhol

*Assistant Examiner* — Ryan Hsu

(74) *Attorney, Agent, or Firm* — Nixon Peabody LLP

(57) ABSTRACT

A method of storing data serially transmitted between a gaming terminal and a computer on one or more servers in a network. The gaming terminal and computer are typically linked in gaming establishments by a serial communication link utilizing serial communication protocols. Although this data is stored on the gaming establishment's computers, it is also highly desirable to make this data accessible on a secure server. Data is monitored and captured directly at the gaming terminal with a communication interface. The communication interface converts the captured data from a serial communication protocol into a network communication protocol for storage on a server in a network.

21 Claims, 7 Drawing Sheets

GAMING TERMINAL DATA MONITORING NETWORK

FIELD OF THE INVENTION

The present invention relates generally to gaming terminals and, more particularly, to a system and method for networking gaming terminals.

BACKGROUND OF THE INVENTION

Gambling is becoming an increasingly popular form of entertainment. Particularly important to the gaming industry are electronic gaming terminals. Electronic gaming terminals include reel slot machines, video poker machines, and video bingo machines. Because such gaming terminals are an important source of income for the gaming industry, casinos continually search for new ways to improve the profitability of their gaming machines by increasing functional capabilities. This includes improving their entertainment value by providing more sophisticated games, visual/audio displays, and user-friendly interfaces. It also includes better gaming terminal security, player-tracking data for implementing marketing strategies, and more sophisticated financial and accounting reports.

Originally gaming machines were provided as stand alone devices that operated independently. Today, most gaming machines are in serial communication with at least one computer that provides serial polling of the gaming machines in a master-slave communication protocol to obtain gaming terminal data. Typically, each gaming function is performed by a separate host computer, which operates independently of any other host computers connected to the gaming machines. For example, an accounting computer, a player tracking computer, and a progressive game computer may all operate independently to perform a specific function. Each host computer is connected to a serial poller that polls a slot machine interface board (SMIB) that is part of each gaming terminal. The SMIB stores data collected from the gaming terminal until the serial poller signals the SMIB to release the data to the host computer.

Serial communication links were first introduced to provide financial accounting and reporting data from each gaming terminal to a host computer. Later, additional casino functions were added such as player tracking, cash less gaming, and progressive bonusing. Each of these functions evolved at different times and generally implemented separately into the casinos' gaming system. These new functions were added piecemeal, simply by making a serial connection from the gaming terminal to a separate, independent host computer to handle that specific gaming function.

The serial connection was an easy technological solution to the demands at the time. However, these serial-based systems are limited, and new functions are needed that cannot be easily supported by these systems. Specifically, what is needed is a system that allows a party, other than the gaming establishment, to securely monitor the flow of data that occurs between the gaming terminals and the gaming establishment's host computers. In particular, it would be highly desirable to enable the non-gaming establishment party to remotely and securely monitor gaming terminal accounting transactions for financial accounting purposes, and other gaming function purposes.

SUMMARY OF THE INVENTION

To solve these problems, the present invention allows a party to monitor the data flow that occurs between serial-based gaming terminals and the host computers (or simply, computers) to which they are connected, and to store that data on a secure server for retrieval by the non-gaming establishment party. Data flow occurring between the serial-based gaming terminals and any number of host computers can be passively and transparently monitored. The monitored data can be collected directly from the gaming terminals and transferred to a secure server for distribution to selected parties. Generally, only a non-gaming establishment party would have access to the secure server, ensuring that the data collected and reported is secure and unaltered.

The present invention's ability to collect, at the point of its inception, raw accounting data from gaming terminals, and store that accounting data on a server, provides a reliable and secure audit trail for all gaming terminal financial transactions. The present invention may use this secure data in a number of different applications. One such application provides a secure financial monitoring system for regulatory authorities. Gaming regulators need a more efficient method to examine gaming terminal financial transactions to simplify their oversight of gaming activities. Currently, accounting data is only available at the gaming establishment, from the gaming establishment's host computers. Gaming regulators do not have real time access to financial data, and cannot monitor activities at the casino unless they themselves are present at the gaming establishment. The present invention allows gaming regulators to monitor, essentially in real time, all gaming terminal transactions that are occurring at the gaming establishment from a remote location. This gaming data is collected directly from the gaming terminal, and stored on a secure server, generally at the gaming establishment. The server may be accessible only by the gaming regulators. This ensures the integrity of the data collected by the server. The regulator, or other outside party, may use an Internet, or intranet connection to download the data from the secure server, or to view the data in real time. As the gaming regulators control the server, the server can provide ad hoc or scheduled reports to the gaming regulators. Software programs the regulators deem necessary to verify the accounting transactions can be placed on the server and tailored to the regulator's functional requirements. This method of collecting accounting data is much more efficient for the gaming regulators, and saves the time and resources of both the gaming establishment and the regulators as it automates the required financial reporting.

Still another application for the present invention is that it can be used to provide economic performance data to the parties of partnerships and joint ventures that typically share revenues from gaming terminals. Revenue sharing gaming terminals are known in the industry as participation games. Participation games are generally joint ventures between a gaming establishment and a gaming manufacturer. The present invention can be used to collect accounting data from each participation gaming terminal, and store the data on a separate server to monitor the economic performance of the partnership gaming terminals. The accounting data from these machines is sent to the gaming establishment's accounting computer, as well as to the separate server. The accounting data collected by the secure server, and the financial reports created from that data, provide a secure accounting basis for the partnership. The separate server allows the non-gaming establishment party to access financial data anytime. This facilitates financial reporting requirements between the parties and provides more useful and current information regarding the games financial performance.

Several potential advantages are possible from this application. First, the secure server only collects accounting data from gaming terminals that are subject to the participation agreement. This allows the system to provide a complete and separate auditable accounting trail for the parties. Any required financial audits are performed on the data collected by the secure server, eliminating the need for the gaming establishment to open its accounting books to any other financial transactions. Second, the system produces a tandem computer system that maintains dual sets of accounting records for the partnership games, reducing the threat of data loss. This invention has the further advantage that the secure server allows the non-gaming establishment party access to participation gaming financial data at anytime. The present invention can also allow real time reporting of financial data as the secure server can be externally accessed. This allows the parties to assess the performance of the participation gaming terminals at any time, and simplify the settling of financial accounts between the parties.

The secure server may also provide other types of data, unrelated to accounting, to the non-gaming establishment party. Information relating to the operation of the game is critical to the outside party since most participation games are maintained by the owner of the equipment. The server, may in the same way it collects accounting data, may also collect maintenance data. This maintenance data may be forwarded as requested, or reported automatically to the non-gaming establishment party. With such automatic notification, maintenance can be initiated more quickly, minimizing the machine's downtime and increasing the potential revenues that the gaming terminal may earn.

Furthermore the present invention can selectively collect data from the monitored data for transmission to the server. Depending on the application, certain data may not be needed, or the data may be confidential to the gaming establishment, or simply irrelevant for the monitoring purpose. This undesired data can be rejected, and only data significant to the application sent to the secure server. This feature is particularly important in those applications where data collection may be impeded by data transmission bottlenecks.

In short, the present invention can provide a means to passively monitor serial data communications between gaming terminals and their host computers, and store that data on a secure server for use by an outside party. Furthermore this can all be done while maintaining the gaming establishment's installed base of gaming terminals, host computers, serial pollers, and software.

Additional aspects of the invention will be apparent to those of ordinary skill in the art in view of the detailed description of various embodiments that is made with reference to the drawings, a brief description of which is provided below.

DETAILED DESCRIPTION

The description of the preferred examples is to be construed as exemplary only and does not describe every possible embodiment of the invention. Numerous alternative embodiments could be implemented, using either current technology or technology developed after the filing date of this patent, which would still fall within the scope of the claims defining the invention.

Overall, the present invention provides a system and method for accessing and monitoring serial data communication between serial-based gaming terminals and computers, and converting this data flow into a network communication protocol for use and storage on a computer network. The data flow is then transmitted in a network communication protocol over a network (e.g., LAN or WAN) for storage on a network server. The network server may then be accessible to an outside party through a dedicated communication line, a public network, or a Wide Area Network (WAN).

Figure 1:
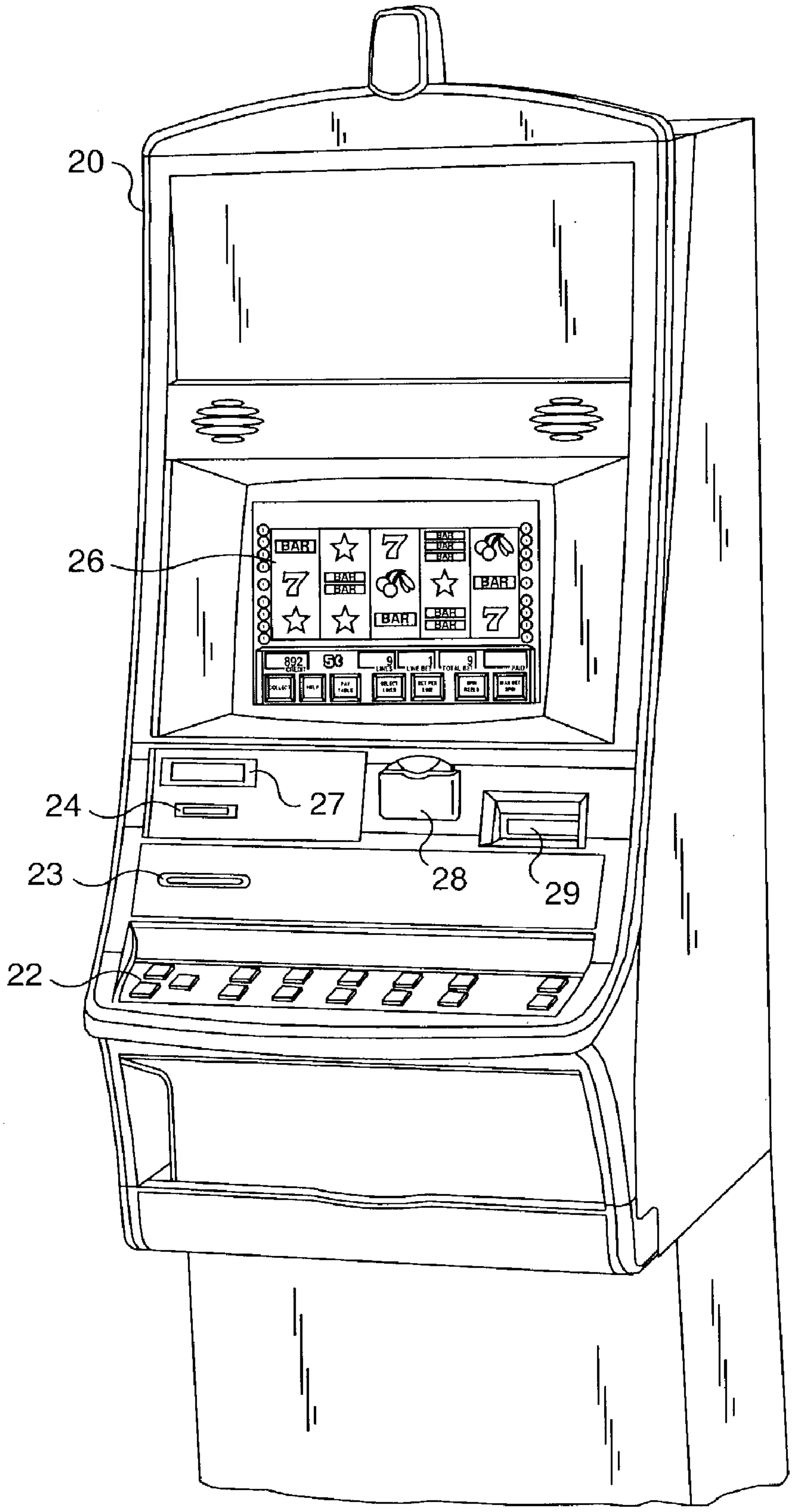
FIG. 1 is a perspective view of an embodiment of a gaming terminal.

FIG. 1 shows a perspective view of a typical serial-based gaming terminal used by gaming establishments. The gaming terminal 20 may be any type of serial-based gaming terminal and may have varying structures and methods of operation. For example, the gaming terminal 20 may be a mechanical gaming terminal configured to play mechanical slots, or it may be an electro mechanical or electrical gaming terminal configured to play a video casino game such as blackjack, slots, keno, poker, etc. Typical components found in a gaming terminal 20 are described below. It should be understood that numerous other elements may exist and may be used in any number of combinations to create a variety of gaming terminal types.

The game itself is displayed to the player on a visual display 26, such as a video display. The video display may take the form of a cathode ray tube (CRT), a high resolution LCD, a plasma display, LED, or any other type of video display suitable for use in a gaming terminal. The visual display 26 may include a touch screen overlaying the monitor to allow players to make game related selections. In the alternative, instead of a video display, the gaming terminal 20 may have a number of mechanical reels to display the game outcome.

A push button panel 22 is also typically offered, in addition to the touch screen, to provide players an option on how they make their game selections. A wager acceptor may include a coin slot acceptor 28 or a note acceptor 29 to input value to the gaming terminal 20.

Many gaming terminals are also equipped with a player tracking card reader 24. A player may be enrolled in the gaming establishments player club and may be awarded certain complimentary services/offers as that player collects points on his player tracking account. The player inserts his card into the reader, which allows the casinos computers to register that player's play at that gaming terminal. The gaming terminal 20 may also include a display 27 to be used with the player-tracking card and card reader 24.

If provided on the gaming terminal 20, a ticket printer 23 may be used to print and/or read or otherwise encode ticket vouchers with the casino name, type of ticket voucher, validation number, bar code with control and/or security data, date and time of issuance of the ticket voucher, redemption instructions and restrictions, description of an award, and/or any other information that may be necessary or desirable.

Figure 2:
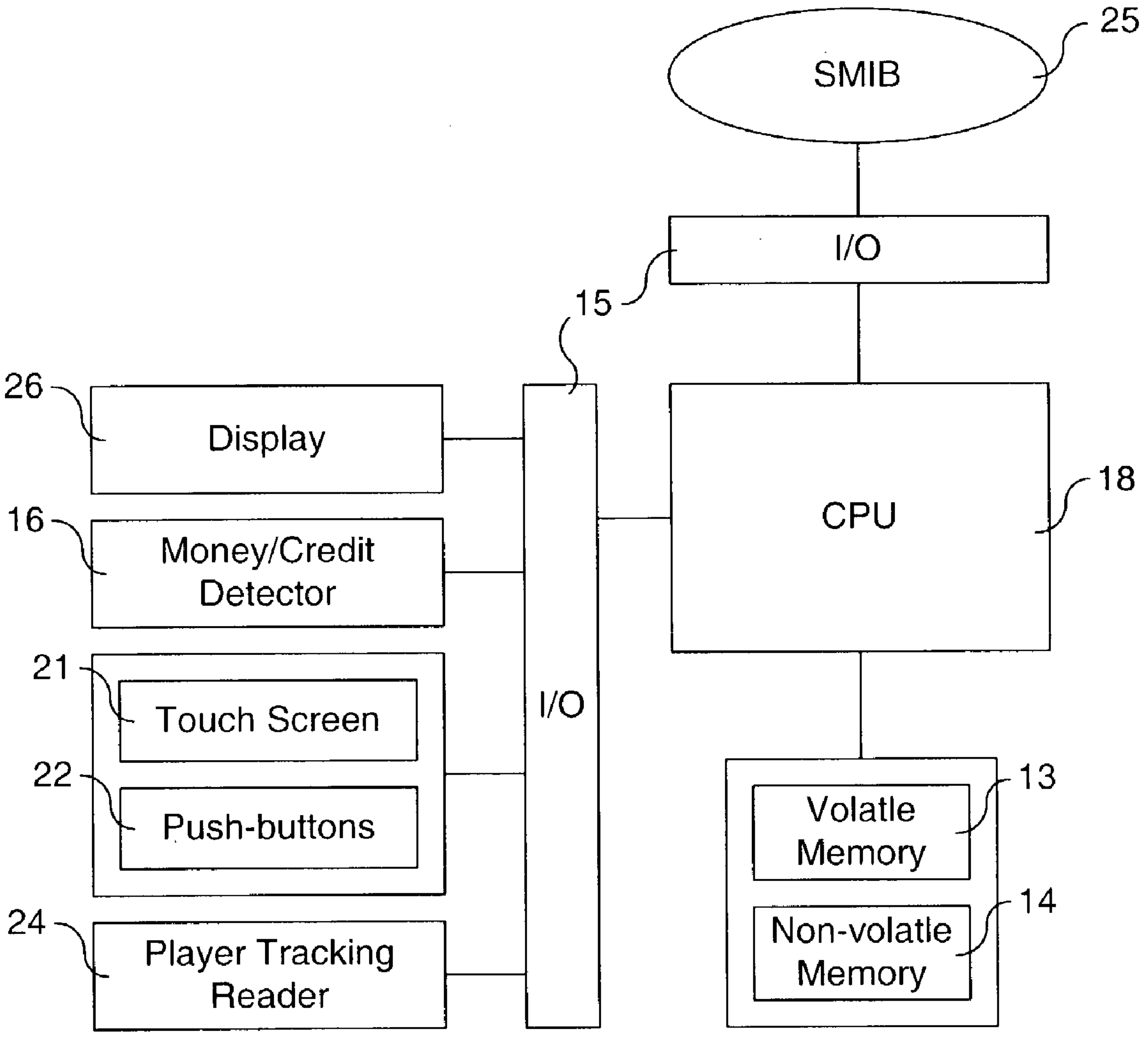
FIG. 2 is a block diagram of the electronic components typically used in the gaming terminal of FIG. 1.

These various potential components of a gaming terminal are controlled by a central processing unit (CPU) 18 (such as a microprocessor or microcontroller) as shown in FIG. 2. The central processing unit 18 operates to execute a game program. The CPU 18 may comprise a volatile memory 13 (e.g., a random-access memory (RAM)), a static memory 14 (such as an EEPROM), and an input/output (I/O) circuit 15. It should be appreciated that although only one microprocessor is shown, the central processing unit may include multiple microprocessors. Similarly, the memory of the central processing unit may include multiple RAM and multiple program memories. Although the I/O circuit may be shown as a single block, it should be appreciated that the I/O circuit may include a number of different types of I/O circuits.

In addition to executing the game program, the CPU also controls and is in communication with each of the peripheral devices comprising the gaming terminal. A variety of peripheral devices may be used in a gaming terminal. Peripheral devices may include a push button panel 22, a player tracking card reader 27, a video display 26, etc. Although three peripheral devices are depicted in FIG. 2, more or fewer peripheral devices may be included in a gaming terminal.

Figure 3:
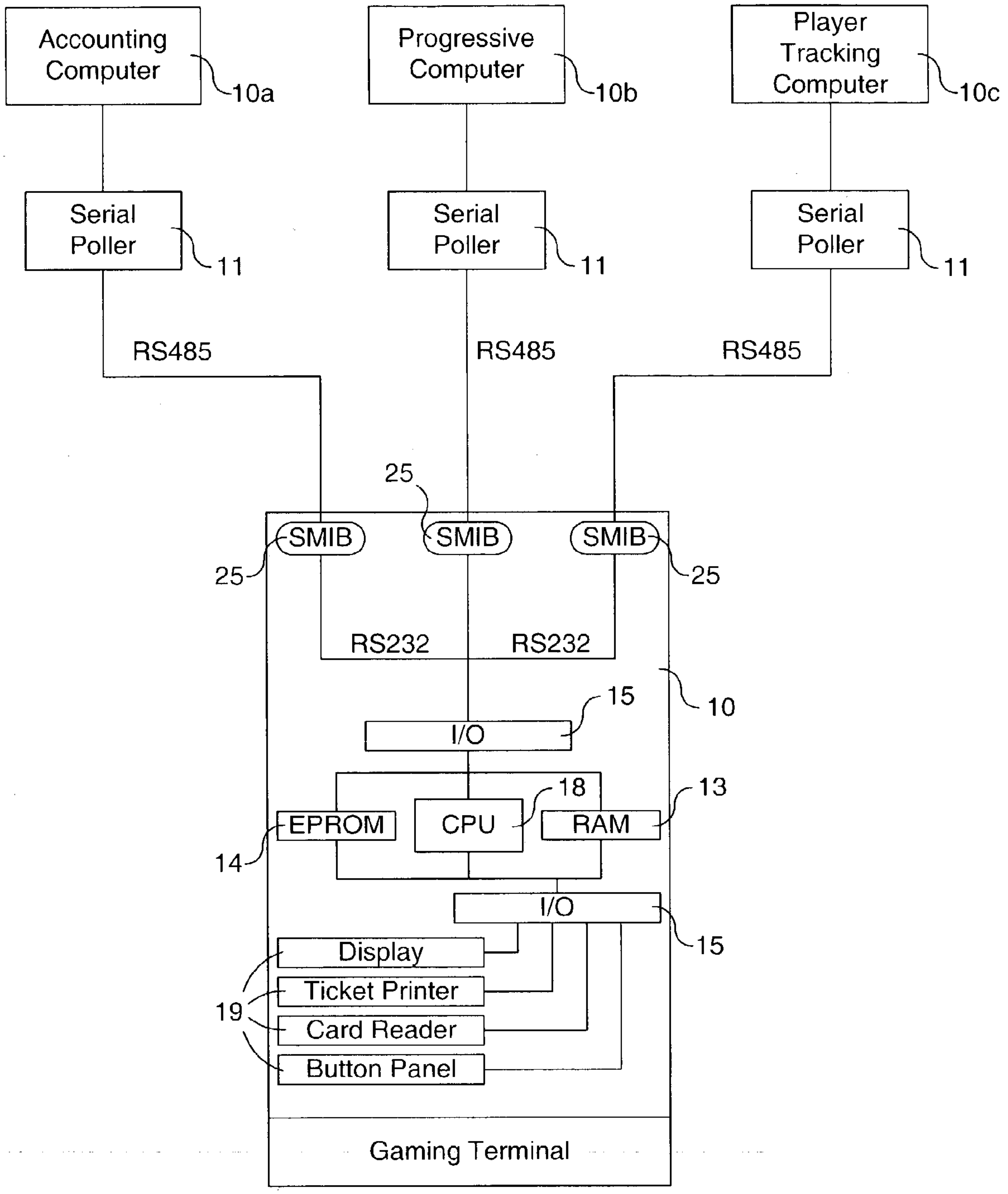
(Prior Art) FIG. 3
FIG. 3 is a block diagram of a typical prior art gaming system with a master/slave serial connection between gaming terminals and discrete serial polling computers.

The gaming terminals in a typical gaming establishment are in serial communication with at least one host computer 10 through a serial poller 11 in a master-slave protocol. FIG. 3 depicts a serial-based communications system using a master-slave protocol that is typically used in gaming establishments. The serial pollers 11*a*, 11*b*, and 11*c* connecting the host computers (10*a*, 10*b*, and 10*c* respectively) to the gaming terminals, are used to poll the gaming terminals 20 for data. It should be understood that the functions of the serial poller 11 may be performed by the host computer 10, negating the need for a separate serial poller. However, for efficiency these two devices are generally not combined into a single computer.

Each individual serial poller 11 polls an individual gaming terminal for data, and the gaming terminal replies with the requested data. Each of the host computers gathers information relating to a specific gaming function from the gaming terminal. Gaming functions may include accounting, player tracking, progressive game controls, and cashless gaming. The function and services provided by some typical computers are described below.

The slot accounting computer 10*a* of FIG. 3 monitors the financial transactions occurring on each individual gaming terminal 20 by collecting data such as credits in, credits out, credits played, credits won, titles of games played, terminals played, denominations of games played, number of games played, duration of play, and specific times of play. The amount and types of collected audit data may be varied to suit a particular casino. The slot accounting computer 20*a* may compile an accounting report based on the data received from each of the individual gaming terminals, which may be used by management to assess the performance and profitability of the gaming terminals 10.

The progressive computer 10*b* of FIG. 3 manages a variety of promotional bonuses such as, multiple jackpot, mystery jackpot, progressive jackpot, or player specific. The progressive computer also has Wide Area Progressive (WAP) game management data capability that allows multiple gaming terminals to contribute to, and compete for system-wide jackpots.

The player tracking server 10*c* shown in FIG. 3 tracks individual player usage of the gaming terminals 20. When a player enrolls in a casino's player tracking system, often called a "slot club" or a "rewards program," the casino issues a player identification card encoded with a player identification number that uniquely identifies the player. The identification card may, for example, be a magnetic card or a smart (chip) card. Each terminal 20 is fitted with a card reader (e.g., card reader 24 in FIG. 1) into which the player inserts his or her identification card before playing the associated terminal 20. The card reader reads the player's identification number off the card and informs the player tracking computer 10*c* connected thereto of the player's subsequent gaming activity. This allows gaming establishments to target individual players with direct marketing techniques, comparables, and other rewards according to the individual's usage.

Figure 4:
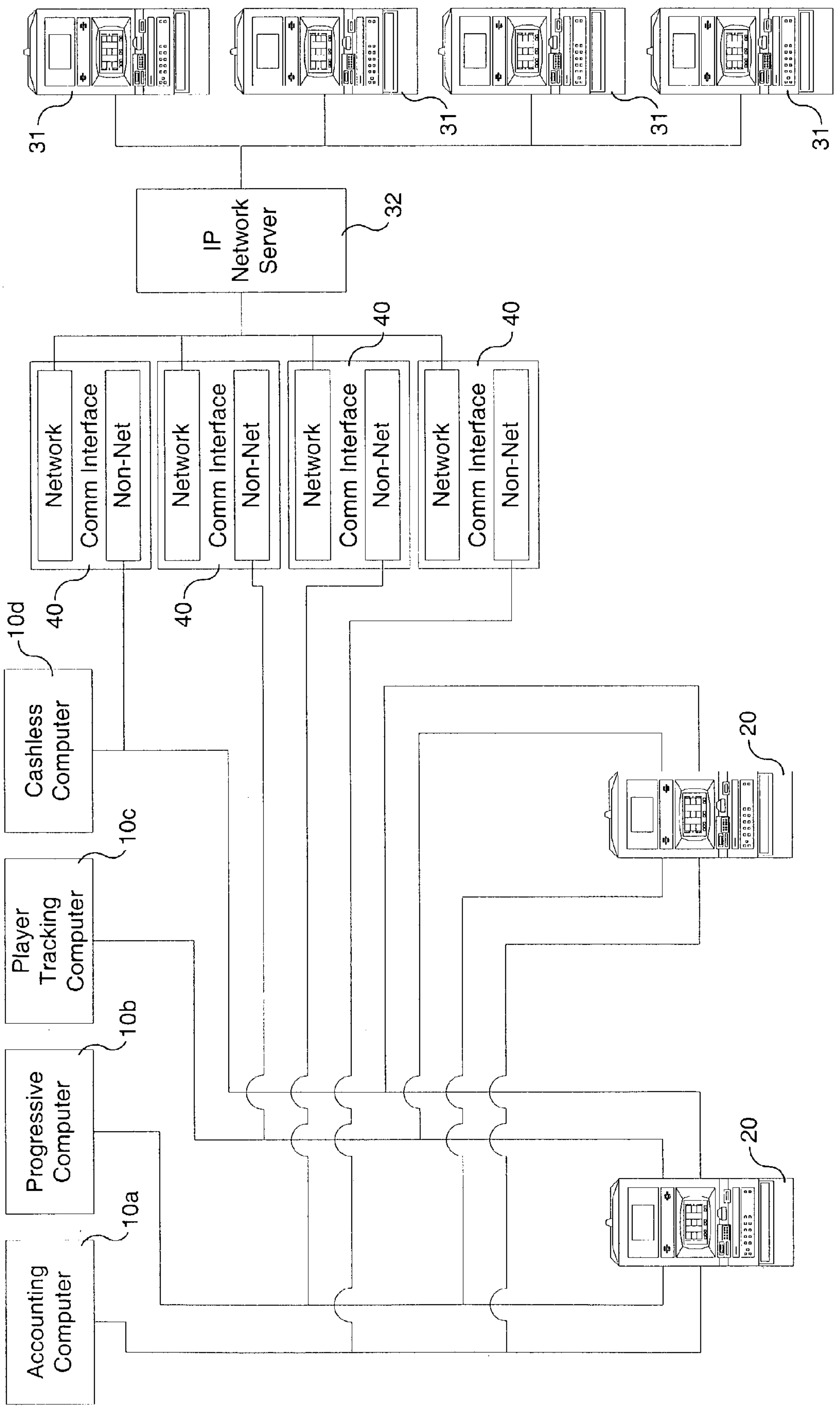
FIG. 4 is a block diagram of an embodiment of the present invention connecting a LAN to the prior art system shown in FIG. 3 at the RS-485 serial communication line.

The cash less gaming computer 10*d* shown in FIG. 4 manages and validates electronic funds transactions. For example, the cash less gaming computer 10*d* may store funds in monetary accounts at the computer, authorize the transfer of funds between accounts and gaming terminals 20, and associate the accounts with portable instruments such as cards or tickets used by players at the gaming terminals 20.

To set up a typical serial communication hardware link, the gaming terminal's RS-232 point-to-point communication protocol is converted to a RS-485 (or RS-485 type) master-slave protocol. A Slot Machine Interface Board (SMIB) 25 is used by each gaming terminal 20 to perform this conversion. The conversion from the RS-232 to the RS-485 protocol eliminates some weaknesses of the RS-232 protocol. One weakness is that each gaming terminal must be separately wired to each host computer if only the RS-232 standard were used. The RS-485 standard provides a multi-drop capability that allows many gaming terminals 20 to communicate with a single host computer 10. As can also be seen in FIG. 3, each SMIB converts the gaming terminal's RS-232 communication protocol to RS-485 output. This allows a communication interface to tap into multiple gaming terminals 20 by connecting the interface to the RS-485 data line as shown in FIG. 4, minimizing wiring requirements.

The SMIB, in addition to storing the gaming terminal communication protocol, also has an embedded proprietary host communication protocol. The SMIB converts the RS-232 input data from a proprietary gaming terminal protocol (e.g., SAS or Bally Simple Serial) to the RS-485 (or proprietary RS-485 type) host communication protocol. The SMIB may poll the gaming terminal for data, as with the SAS protocol, or the SMIB may only listen for data from the gaming terminal as it is produced on an event driven basis. This data is stored on the SMIB and is accessible to the host or polling computer via the SMIB's RS-485 side. The RS-485 side of the SMIB takes that data, when polled by the polling computer, and transmits it, typically, in a proprietary RS-485 type communication protocol to the host computer.

Any number of different proprietary communication protocols may be used to allow the gaming terminal to communicate with a host computer. Each computer shown in FIG. 3 may use a different communication protocol depending on the gaming function served by the host computer. For example, the slot accounting computer may use IGT's Slot Accounting System (SAS) protocol, or it may use Bally's Gaming Systems Bally Simple Serial protocol. Similarly the player-tracking computer may use Bally's Slot Data System (SDS) protocol, or IGT's SAS protocol.

A SMIB 25 is shown in FIG. 3 as 25*a*, 25*b*, and 25*c* and is typically part of a gaming terminal 20. Each gaming terminal typically has multiple serial ports, each port connected to a SMIB and dedicated to providing data to a specific host computer. An individual SMIB typically serves each host computer to maintain consistent software communication protocols between the gaming terminal and its computer.

A data communication interface 40 monitors the data flow between the serial communication line that connects the gaming terminal to a host computer. The data communication interface converts the serial communication protocol to a network communication protocol. The data communication interface may also be used to convert the software communication protocol used on the non-network side to a second communication protocol compatible with the network server. The data flow monitored, captured, and converted by the communication interface 40 is relayed to a network server 32 for storage. Converting the proprietary serial communication protocol to an open or public protocol such as TCP/IP (Transmission Control Protocol/Internet Protocol) by the communication interface is highly desired. Other network communication protocols that potentially could be used include ATM, SLIP, PPP, or a layer protocol transmitted onto of TCP/IP. The LAN may also utilize any physical communication medium desired (e.g., Ethernet, fiber optic, wireless Ethernet, etc.).

The data communication interface 40 operates transparently to the installed serial communication system, allowing standard communication between the serial-based gaming terminals and their host computers. For simplicity, the serial-based gaming terminals, computer, and their serial line connections are called a non-networked system, whereas the network (LAN, WAN, or public) created by the server and supporting components (e.g., proxy servers, routers, hubs, etc.) is called a networked system. The data communication interface 40 is the transition point between the two systems.

An embodiment of the present invention using a network with a client-server architecture is shown in FIG. 4. The prior art serial-based gaming terminals 20 and computers 10 are in serial communication using a master-slave protocol that is identical and operates as described above. FIG. 4 also shows a network 30 (e.g., a local area network (LAN)) tapped into the prior art serial communication line connecting the serial-based gaming terminals with their host computers. The server 32 captures all information that flows between the computers 10 and the gaming terminal 20 on the serial-based communication network through the data communication interface 40.

Figure 5:
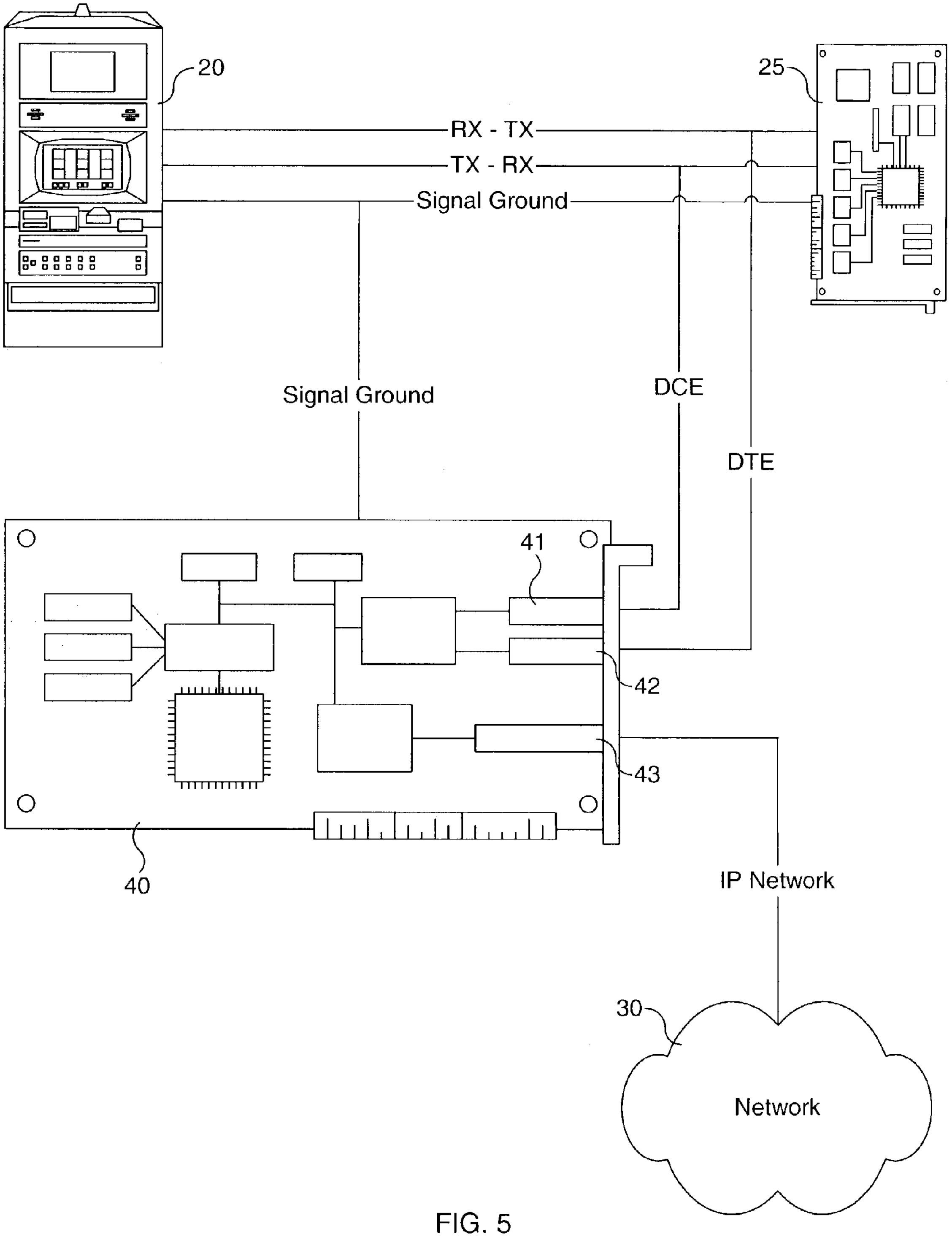
FIG. 5 is a block diagram of an embodiment of the present invention connecting a LAN to the prior art system shown in FIG. 3 to the RS-232 serial communication line.

The data communication interface 40 can be configured to tap into the RS-232 serial line from each gaming terminal as shown in FIG. 5. In the standard RS-232 protocol, the Data Circuit Terminating Equipment (or, DCE) always works in complimentary fashion to the Data Terminal Equipment (or, DTE) to manage control signals that allow each device to know when it will send, and when it will receive a communication. The DCE in FIG. 5 is the gaming terminal 20. The DTE is the SMIB, which generally resides inside the gaming terminal 20. The RS-232 protocol has a conductor that sends a signal and a conductor that receives serial data as depicted by the RX-TX and the TX-RX lines in FIG. 5. These are the communication lines that the communication interface taps to capture the data flow between the two serial devices. Note that it is possible for only one side of the transmission to be monitored. For example, capturing the data flow from the gaming terminal to the SMIB, rather than also capturing the query that requests the data (as in the Bally Simple Serial protocol). The RS-232 protocol is converted to a network communication protocol by the communication interface 40 and is transmitted to the network through an output port (e.g., an Ethernet port).

Alternatively, the data communication interface 40 can also be tapped into each RS-485 communication line running from the gaming terminal's SMIB 25 to the serial poller. Connecting the tap to the RS-485 connection is more complicated because of the proprietary host protocols implemented at this point, but is also more easily and economically wired to the network. The communication interface translates the serial communication protocol (used by the SMIB and its host computer) into a network communication protocol.

Figure 6:
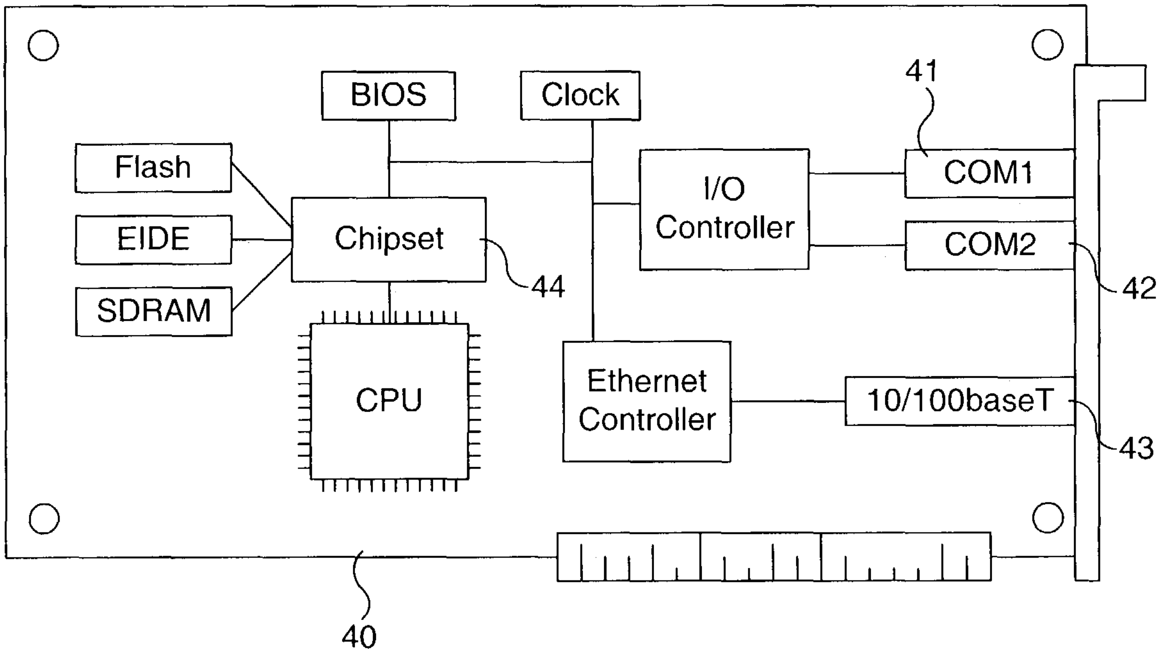
FIG. 6 is a detailed block diagram of a communication interface used to monitor serial communications between devices and translate communication protocols.

The data communication interface 40 shown in FIG. 6 has two serial input ports, also known as COM ports 41, 42, and an output port 43. The communication interface 40 monitors the communication data flow from the gaming terminal 10 to a host computer 20 through one of the COM ports 41, and the return communication data flow from a serial poller 11/computer 20 to the gaming terminal 10 through the other COM port 42. The serial communication protocol is converted using the logic and programming on chip set 44 to a second communication protocol, such as TCP/IP. In this manner the data flow between each gaming terminal and computer may be captured and converted from a first communication protocol to a second communication protocol and transmitted through the output port 43 (e.g., an Ethernet port) onto a LAN. Changes in communication protocols may affect only that portion of the communication protocol affecting changes from serial to network based communications, or may also include changes in software protocols as well.

Although the communication interface discussed above is only described as a passive device that relays data flow in a single direction, the communication interface could be converted to an active device that emulates the serial pollers/host computers and collect data from the each gaming terminal's SMIB. Further, the communication interface may be programmed to only transmit selected data to the server to minimize data traffic and maintain protection for proprietary data that the gaming establishment does not wish to disseminate to an outside party.

On the network side of the system, the network 30 may include networked based gaming terminals 31 connected to the LAN and the server 32. Although each of these network based gaming terminals 31 may be configured by a client that relies on the server(s) for resources (i.e., client/server architecture), they may also be configured with capability equivalent to the server(s) (i.e., a peer-to-peer architecture). Other servers or computers (not shown) may be included within the network 30 to manage network resources (e.g., files, storage, application programs, printers and other devices). For example, the network 30 may include a network computer for managing network traffic, a proxy server for improving network performance, etc.

The LAN topology may be a bus topology, a star topology, a ring topology, a tree topology, or a mesh topology. FIG. 4 depicts bus topology in which all networked gaming terminals 20 are connected to a central cable, called the bus or backbone 14. Bus networks are inexpensive and easy to install for small networks.

Figure 7:
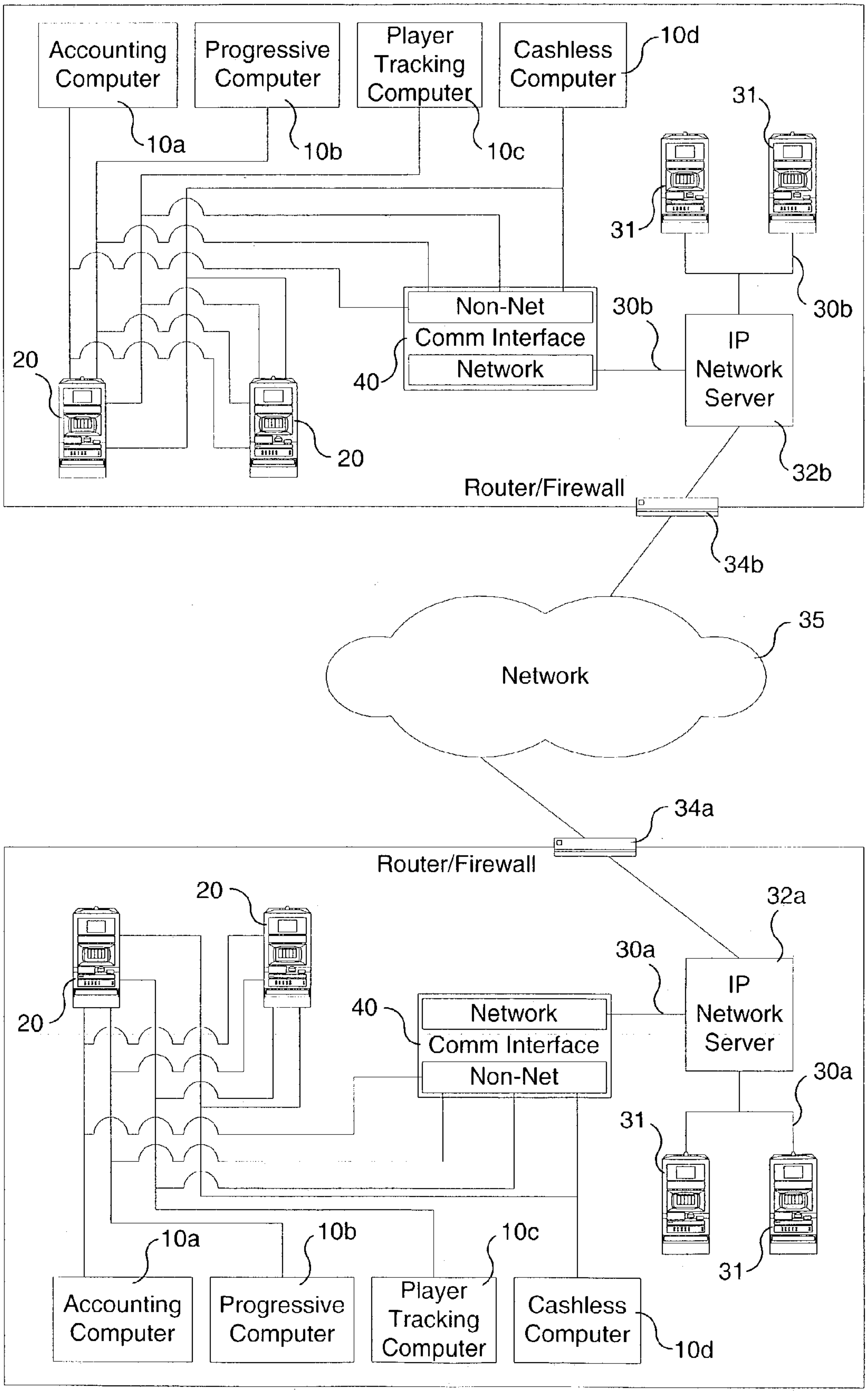
FIG. 7 is a schematic of how two or more LANs may be connected to form a WAN.

Furthermore, as shown in FIG. 7, the LAN 30 may be expanded into a WAN 35 using, for example, the Internet. This allows a large gaming proprietor to link gaming terminals within a large casino and between two or more casinos. The communication segments to provide this WAN may include private leased phone lines, private microwave or satellite links, dedicated hard wire, etc. Servers 32*a*, 32*b* may interface with these communications lines. One server, such as 32*a*, may act as the central server. The central server may be accessed by outside parties, either at the gaming establishment itself, or offsite through an Internet, intranet, or Wide Area Network. Each of the property LANs 30*a*, 30*b* is communicatively coupled to the internet 35 via a router 34*a*, 34*b* respectively. Although only one router is shown associated with each network 30, additional routers may be included, depending on the desired network configuration. Data from the gaming terminals whether they are solely serial-based gaming terminals 10, or a mix of serial and IP networked gaming terminals 31, from any number of LANs can transmit data to a central server 32*a*, over the WAN. Although the LAN 30 in FIG. 7 is shown coupled to only two serial-based gaming terminals 31, two networked based gaming terminals 31, and one server 32, it should be understood that different numbers of gaming terminals and servers might be used. For example, the serial network and the IP network may include a plurality of servers and tens and/or hundreds of gaming terminals, all of which may be interconnected via the LAN 30 and theWAN 35.

What is claimed is:

1. A method of storing data transmitted between a gaming terminal and a computer by storing the data on a monitoring server, the method comprising:

transmitting data having a plurality of types of different data between said gaming terminal and said computer in a first communication protocol;

receiving the data on said computer;

storing the data on said computer;

passively monitoring the data with a communication interface, said communication interface incapable of initiating data transmission between said gaming terminal and said computer;

selecting at least one type of the plurality of types of data;

converting data of the selected type of data into a second communication protocol with said communication interface;

transmitting the selectively converted data in said second communication protocol to said monitoring server, said monitoring server different from said computer and incapable of transmitting data to said computer; and storing the data of the selected type of data transmitted in said second communication protocol on said monitoring server.

2. The method of storing data as described in claim 1, further including a communication line connecting said computer and said gaming terminal, and wherein said communication interface further includes:

at least one serial communication port connected to said communication line; and a network communication port connected to said network.

3. The method of storing data described in claim 1, further including:

receiving the data transmitted in said first communication protocol with an interface board;

converting the data in said first communication protocol to a third communication protocol with said interface board; and continuing the transmission of the data in said third communication protocol to said computer.

4. The method of storing data described in claim 3, wherein said first and said third communication protocols are serial communication protocols, and said second communication protocol is a network communication protocol.

5. The gaming terminal of claim 4, wherein said serial communication protocols are selected from the group consisting of RS-232, RS-422, or RS-485.

6. The gaming terminal of claim 4, wherein said network communication protocol is selected from the group of TCP/IP, SLIP, and PPP communication protocols.

7. A gaming computer system for storing data comprising:

a gaming terminal having a central processing unit for controlling gaming functions of said gaming terminal;

a computer;

a serial communication line connecting said computer and said central processing unit, said serial communication line for transmitting and receiving data having a plurality of types of different data using a serial communication protocol between the computer and gaming terminal when initiated by either the gaming terminal or the computer;

a monitoring server;

a network using a network communication protocol, said monitoring server connected to said network; and a communication interface having at least one serial port and a network port, said serial port connected to said serial communication line, said network port connected to said network, said communication interface for capturing the data transmitted on said serial communication line only when the computer or gaming terminal initiates transmission of the data, selecting at least one type of the plurality of types of data, and converting the data of the selected type of data from said serial communication protocol to said network communication protocol, said communication interface further for transmitting the data of the selected type of data in said network communication protocol to said monitoring server; whereby the data of the selected type of data transmitted from said gaming terminal may be stored on both said computer and said monitoring server.

8. The gaming computer system described in claim 7, further comprising an interface board for receiving the data transmitted over said serial communication line, and further for converting the data from a first serial communication protocol to a second serial communication protocol.

9. The gaming computer system of claim 8, wherein said first and second serial communication protocols are selected from the group consisting of RS-232, RS-422, or RS-485.

10. The gaming computer system of claim 8, wherein said network communication protocol is selected from the group of TCP/IP, SLIP, and PPP communication protocols.

11. The gaming computer system of claim 8, wherein said network communication protocol includes a proprietary software communication protocol.

12. The gaming computer system of claim 8, wherein said first communication protocol includes a proprietary software communication protocol that is different from said second communication protocol.

13. A gaming computer system for storing data comprising:

a gaming terminal having a central processing unit for controlling gaming functions of said gaming terminal;

a computer;

a serial communication line connecting said computer and said central processing unit, said serial communication line for transmitting and receiving data having a plurality of types of different data using a serial communication protocol;

a monitoring server;

a network using a network communication protocol, said monitoring server connected to said network;

a communication interface having a plurality of serial ports and a network port, said serial ports connected to said serial communication line, one said serial port connected to receive the data from said computer, another said serial port connected to receive the data from said gaming terminal, said network port connected to said network, said communication interface for monitoring transmitted data on said serial communication line, selecting at least one type of the plurality of types of data, capturing the data of the selected type of data, when the data transmission is initiated by either the central processing unit or the computer and converting the data of the selected type of data from said serial communication protocol to said network communication protocol, said communication interface further for transmitting the data of the selected type of data in said network communication protocol to said monitoring server;

whereby data transmitted from said gaming terminal may be stored on both said computer and said monitoring server.

14. The gaming computer system described in claim 13, further comprising an interface board for receiving data transmitted over said serial communication line, and further for converting the data from a first serial communication protocol to a second serial communication protocol.

15. The gaming computer system of claim 14, wherein said first and second serial communication protocols are selected from the group consisting of RS-232, RS-422, or RS-485.

16. The gaming computer system of claim 14, wherein said network communication protocol is selected from the group of TCP/IP, SLIP, and PPP communication protocols.

17. A method of acquiring data, comprising:

transmitting and receiving data having a plurality of types of different data between a gaming terminal and a host computer on initiation of either the gaming terminal or the host computer over a communication link, the data being transmitted in a first communication protocol;

selecting at least one type of the plurality of types of data;

converting the data of the selected type of data to a second communication protocol with an interface device coupled to said communication link only when transmitted by either the gaming terminal or host computer; and transmitting the data of the selected type of data in said second communication protocol to a server of a network.

18. The method of storing data described in claim 17, wherein said first communication protocol is a serial communication protocol, and said second communication protocol is a network communication protocol.

19. The gaming computer system of claim 18, wherein said first serial communication protocol is selected from the group consisting of RS-232, RS-422, or RS-485.

20. The gaming computer system of claim 18, wherein said network communication protocol is selected from the group of TCP/IP, SLIP, and PPP communication protocols.

21. A method of acquiring data, comprising:

transmitting and receiving data having a plurality of types of different data between a gaming terminal and a host computer on initiation of either the gaming terminal or the host computer over a communication link between the gaming terminal and host computer;

tapping the data with a passive interface device coupled to said communication link only when data transmission is initiated by either the gaming terminal or host computer, the passive interface device incapable of transmitting data on the communication link between the gaming terminal and host computer;

selecting at least one type of the plurality of types of data; and transmitting the data of the selected type of data from the passive interface device to a server in a network.

* * * * *